US010097546B2

(12) United States Patent
Hao et al.

(10) Patent No.: US 10,097,546 B2
(45) Date of Patent: Oct. 9, 2018

(54) AUTHENTICATION OF A USER DEVICE USING TRAFFIC FLOW INFORMATION

(71) Applicant: Verizon Patent and Licensing Inc., Arlington, VA (US)

(72) Inventors: Jianxiu Hao, Acton, MA (US); Fenglin Yin, Lexington, MA (US); Zhong Chen, Acton, MA (US); Pramod Kalyanasundaram, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 70 days.

(21) Appl. No.: 14/805,725

(22) Filed: Jul. 22, 2015

(65) Prior Publication Data

US 2017/0026369 A1 Jan. 26, 2017

(51) Int. Cl.
*H04L 29/06* (2006.01)

(52) U.S. Cl.
CPC ...... *H04L 63/0876* (2013.01); *H04L 63/0884* (2013.01); *H04L 63/107* (2013.01)

(58) Field of Classification Search
CPC .................................................. H04L 63/0876
See application file for complete search history.

(56) References Cited

U.S. PATENT DOCUMENTS

| | | | | |
|---|---|---|---|---|
| 8,612,514 B2 * | 12/2013 | Greschler | ........... | G06F 9/44526 709/203 |
| 8,763,101 B2 * | 6/2014 | Counterman | ......... | H04W 12/06 713/168 |
| 8,868,254 B2 * | 10/2014 | Louboutin | ............ | H04W 4/021 701/2 |
| 8,875,244 B1 * | 10/2014 | Vaystikh | ............... | H04L 9/3228 709/225 |
| 9,009,302 B2 * | 4/2015 | Detienne | ............... | H04L 9/0833 709/223 |
| 9,060,057 B1 * | 6/2015 | Danis | ................. | H04M 3/42059 |
| 9,168,927 B2 * | 10/2015 | Louboutin | ............ | H04W 4/021 |
| 9,338,164 B1 * | 5/2016 | Liu | ..................... | H04L 63/0869 |
| 9,894,074 B2 * | 2/2018 | Yun | ........................ | H04L 63/101 |
| 2003/0212605 A1 * | 11/2003 | Chin | ..................... | G06F 17/289 705/26.41 |
| 2004/0148262 A1 * | 7/2004 | Yamamoto | ............ | G06F 21/105 705/59 |
| 2004/0255137 A1 * | 12/2004 | Ying | ................... | H04L 63/0442 713/193 |

(Continued)

*Primary Examiner* — Yin Chen Shaw
*Assistant Examiner* — Richard W Cruz-Franqui

(57) ABSTRACT

A device may receive traffic flow information that includes user device identifiers. The device may receive, from a user device accessing an application associated with a third party service, an authentication request to authenticate the user device with a third party device that provides the third party service. The request may include a session token that identifies a session, an application identifier that identifies the application, and a user device identifier that identifies the user device. The device may determine to authenticate the user device based on whether the user device identifier matches one of the user device identifiers included in the traffic flow information. The device may provide, to the third party device, the session token and an indication of whether the user device has been authenticated to permit the third party device to allow or deny access to the third party service.

20 Claims, 15 Drawing Sheets

(56) References Cited

U.S. PATENT DOCUMENTS

| Publication No. | Date | Name | Classification | Subclass |
|---|---|---|---|---|
| 2005/0152275 A1* | 7/2005 | Laurila | H04L 43/18 | 370/241 |
| 2008/0130574 A1* | 6/2008 | Nam | H04L 47/10 | 370/331 |
| 2009/0125992 A1* | 5/2009 | Larsson | H04W 12/04 | 726/6 |
| 2009/0296913 A1* | 12/2009 | Thomas | H04M 3/42348 | 379/211.02 |
| 2010/0293250 A1* | 11/2010 | Ankaiah | H04L 12/56 | 709/219 |
| 2012/0094633 A1* | 4/2012 | Parsons | H04L 63/101 | 455/411 |
| 2012/0167162 A1* | 6/2012 | Raleigh | G06F 21/57 | 726/1 |
| 2012/0266258 A1* | 10/2012 | Tuchman | H04L 63/104 | 726/28 |
| 2013/0007865 A1* | 1/2013 | Krishnamurthy | G06F 21/552 | 726/7 |
| 2013/0097674 A1* | 4/2013 | Jindal | H04L 63/0876 | 726/4 |
| 2013/0262857 A1* | 10/2013 | Neuman | H04L 63/08 | 713/155 |
| 2013/0305320 A1* | 11/2013 | Warrick | H04L 61/103 | 726/4 |
| 2014/0013108 A1* | 1/2014 | Pellikka | H04L 63/0807 | 713/156 |
| 2014/0026179 A1* | 1/2014 | Devarajan | G06F 21/51 | 726/1 |
| 2014/0040628 A1* | 2/2014 | Fort | G06F 21/34 | 713/182 |
| 2014/0068721 A1* | 3/2014 | Ong | H04L 63/107 | 726/4 |
| 2014/0282823 A1* | 9/2014 | Rash | H04L 63/20 | 726/1 |
| 2014/0344913 A1* | 11/2014 | Stahl | H04L 12/1403 | 726/11 |
| 2015/0023168 A1* | 1/2015 | Kotecha | H04W 28/0289 | 370/232 |
| 2015/0089568 A1* | 3/2015 | Sprague | H04L 63/0876 | 726/1 |
| 2015/0089621 A1* | 3/2015 | Khalid | H04L 63/08 | 726/9 |
| 2015/0092551 A1* | 4/2015 | Moisand | H04L 12/4633 | 370/235 |
| 2015/0106900 A1* | 4/2015 | Pinski | H04L 63/0876 | 726/7 |
| 2015/0237049 A1* | 8/2015 | Grajek | H04L 63/0815 | 726/7 |
| 2015/0249540 A1* | 9/2015 | Khalil | H04L 63/0853 | 713/158 |
| 2015/0304324 A1* | 10/2015 | Kirsch | H04L 63/0876 | 726/5 |
| 2015/0326514 A1* | 11/2015 | Liberty | G06Q 10/10 | 709/206 |
| 2015/0326613 A1* | 11/2015 | Devarajan | G06F 21/51 | 726/1 |
| 2015/0358334 A1* | 12/2015 | Lantz | G06F 8/65 | 726/3 |
| 2015/0381515 A1* | 12/2015 | Mattson | H04L 41/145 | 707/609 |
| 2016/0006740 A1* | 1/2016 | Yun | H04L 63/0236 | 709/225 |
| 2016/0016526 A1* | 1/2016 | Louboutin | H04W 4/021 | 701/2 |
| 2016/0036856 A1* | 2/2016 | Liu | H04L 63/0263 | 726/1 |
| 2016/0119325 A1* | 4/2016 | Doshi | H04L 63/0815 | 726/7 |
| 2016/0127440 A1* | 5/2016 | Gordon | H04N 21/23439 | 709/219 |
| 2016/0157056 A1* | 6/2016 | Kim | H04W 4/023 | 455/414.1 |
| 2016/0191568 A1* | 6/2016 | Nispel | H04L 43/04 | 726/1 |
| 2017/0026369 A1* | 1/2017 | Hao | H04L 63/0876 | |
| 2017/0076274 A1* | 3/2017 | Royyuru | G06Q 20/18 | |
| 2017/0091294 A1* | 3/2017 | Vibhor | G06F 17/30557 | |
| 2017/0188232 A1* | 6/2017 | Raleigh | H04W 12/06 | |
| 2018/0109664 A1* | 4/2018 | Haltom | H04M 1/663 | |

* cited by examiner

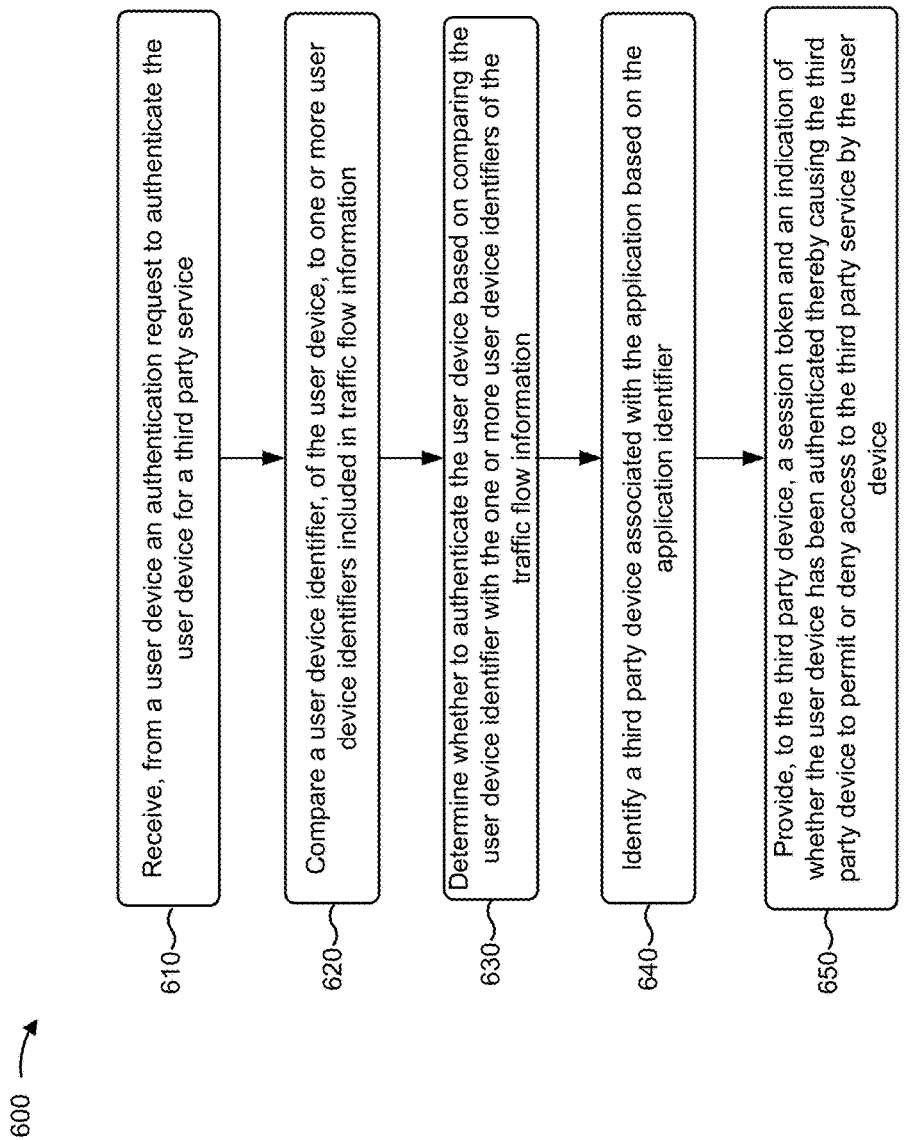

AUTHENTICATION OF A USER DEVICE USING TRAFFIC FLOW INFORMATION

BACKGROUND

Authentication is a process for proving the identity of an authorized user so that the authorized user can gain access to a protected resource. Authentication may be accomplished using a password. For example, a username and password may be used by an authorized user during a log-in process that controls access to protected computing devices, operating systems, applications (e.g., email, web sites, etc.), databases, networks, etc.

BRIEF DESCRIPTION OF THE DRAWINGS

FIG. 6 is a flow chart of an example process for authenticating a user device using traffic flow information;

DETAILED DESCRIPTION OF PREFERRED EMBODIMENTS

The following detailed description of example implementations refers to the accompanying drawings. The same reference numbers in different drawings may identify the same or similar elements.

User authentication may be achieved by requiring a user to enter a username and/or a password in order for the user's identity to be verified. However, requiring a username and password for user authentication may be inefficient. For example, the user may use a single username or password for multiple services, which may cause security issues if there is a security breach in one of the services. Alternatively, the user may use different usernames or passwords for different services, which may cause the user to forget a username or password. Also, usernames and passwords may be hacked, stolen, forgotten, misplaced, etc. Implementations described herein may provide another means of authentication using traffic flow information (e.g., information in association with user devices belonging to a network (e.g., a mobile network), which may include a protocol identifier, a source network address (e.g., a source internet protocol (IP) address), a source port identifier, a destination network address (e.g., a destination IP address), a destination port identifier, etc.), which may reduce user reliance on usernames and passwords and/or may increase security.

Figure 1:
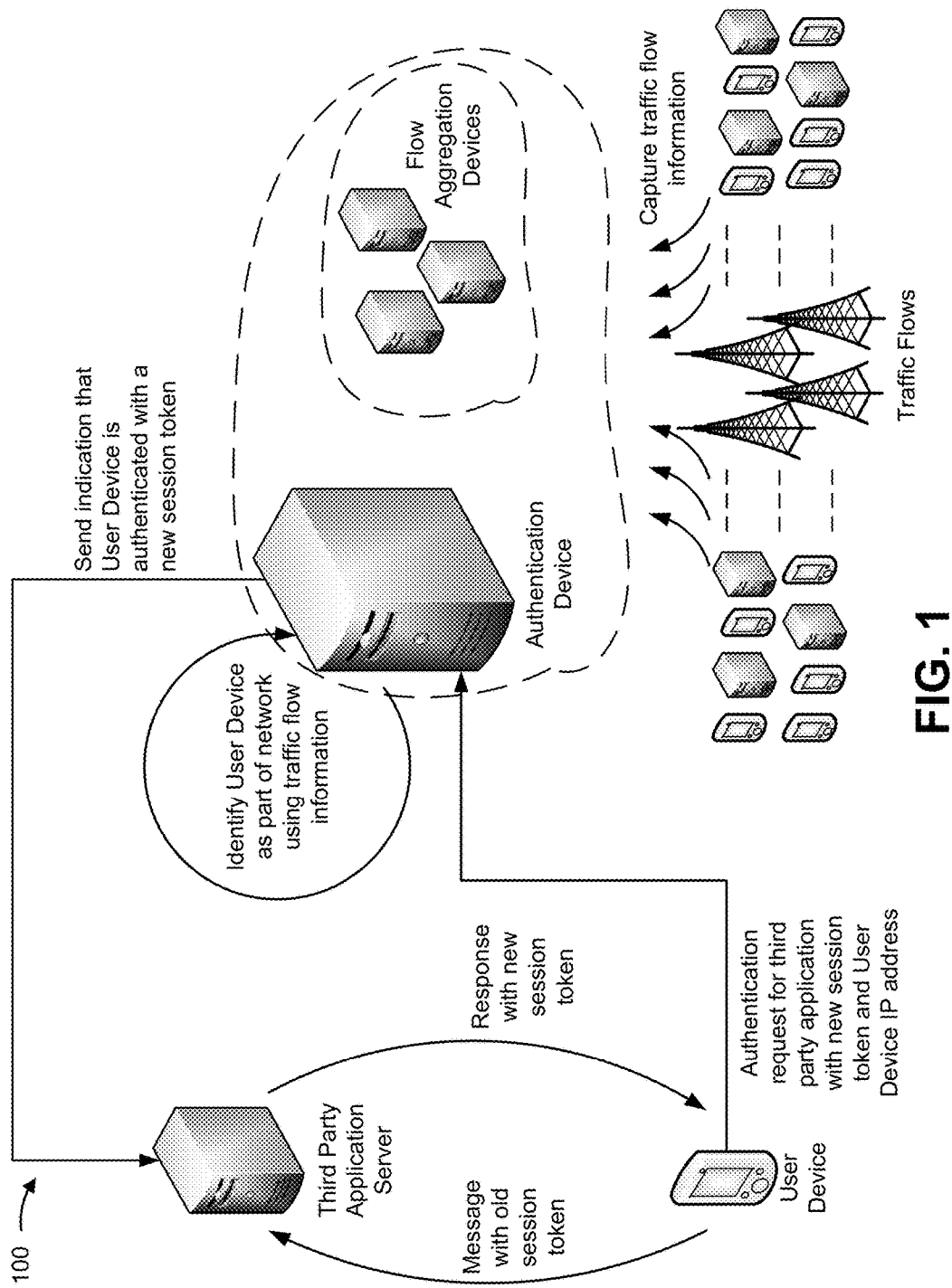
FIG. 1 is a diagram of an overview of an example implementation described herein.

FIG. 1 is a diagram of an overview of an example implementation 100 described herein. As shown in FIG. 1, assume that example implementation 100 includes a user device, a third party application server, an authentication device, and flow aggregation devices. The third party application server may host an application that the user device is attempting to access. The authentication device may be used to authenticate the user device for the third party application server using traffic flow information which the authentication device gets from flow aggregation devices. The flow aggregation devices can capture traffic flow information from user devices on a network.

As further shown in FIG. 1, assume that the user device attempts to use an application associated with a third party and sends a message with an old session token to the third party application server. Since the old session token is expired, the third party server responds to the user device by sending a new session token. The user device in turn provides, to the authentication device, an authentication request for the application along with the new session token and an internet protocol (IP) address of the user device. The authentication device compares the IP address with the traffic flow information, which the authentication device has obtained using the flow aggregation devices, and identifies the user device as a valid user device that has communicated using the network. The authentication device then sends, to the third party application server, an indication that the user device is authenticated with the new session token to complete the authentication process. The third party application server uses the new session token and the indication of authentication to grant the user device access to the application associated with the third party.

In this way, the authentication device offers a new means of authentication with the use of authentication using traffic flow information. Authentication using traffic flow information may be used as a substitute for authentication by username and password, or as a supplement to authentication by username and password. Authentication using traffic flow information may be useful by improving security, increasing efficiency, and reducing reliance on usernames and passwords, which may be hacked, stolen, forgotten, misplaced, or the like.

Figure 2:
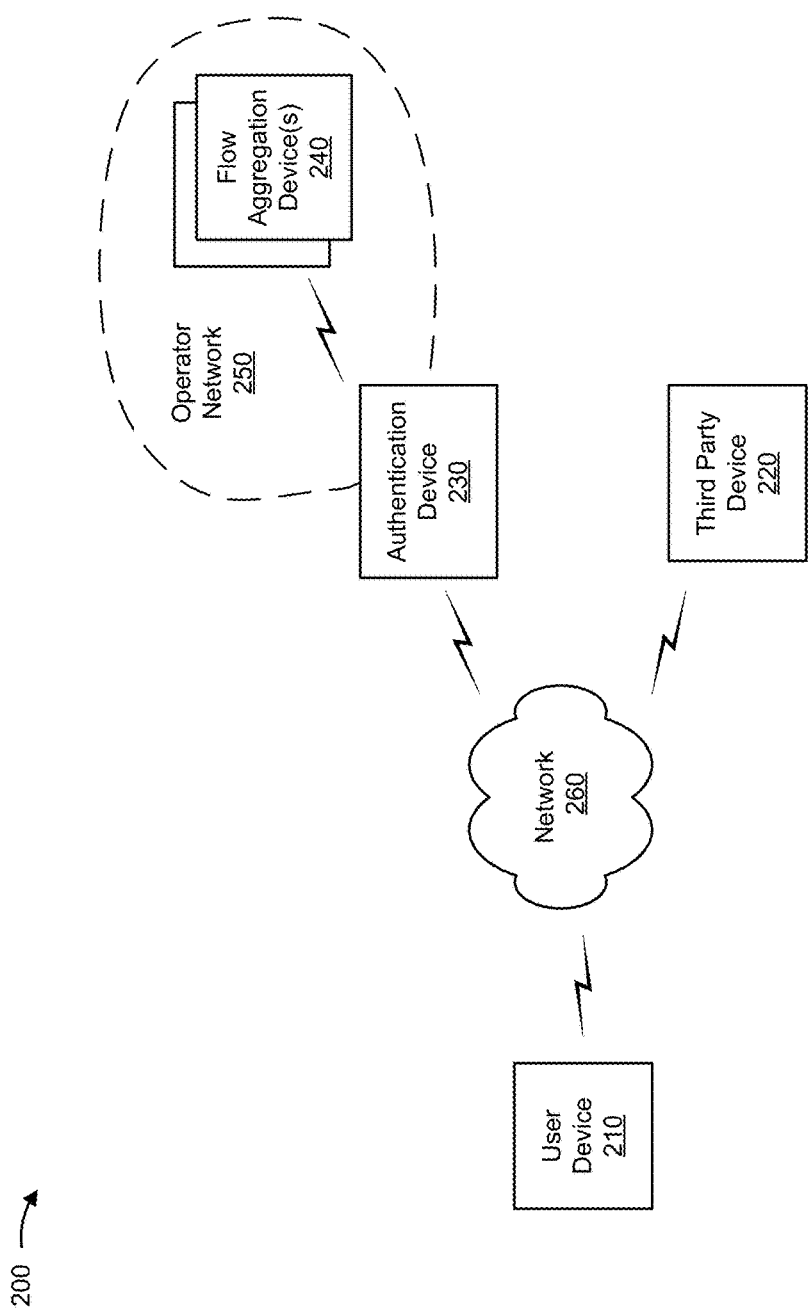
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a third party device 220, an authentication device 230, one or more flow aggregation devices 240, an operator network 250, and/or a network 260. Devices of environment 200 may interconnect via wired connections, wireless connections, or a combination of wired and wireless connections.

User device 210 may include one or more devices capable using an application (e.g., a mobile application, a website, etc.) that permits or denies access to a third party service (e.g., a banking service, a video streaming service, a retail service, etc.) provided by third party device 220. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a set top box, or a similar type of device. In some implementations, user device 210 may store session tokens (e.g., information relating to a session associated with an application that may be used to authenticate a user). Additionally, or alternatively, user device 210 may get a session token from third party device 220. Additionally, or alternatively, user device 210 may send an authentication request, to authentication device 230, which may include the session token to gain access to the third party service. In some implementations, user device 210 may gain access to the third party service via third party device 220 after authentication device 230 has indicated, to third party device 220, that user device 210 is authenticated.

Third party device 220 may include one or more devices capable of receiving, generating, storing, processing, and/or providing information associated with a third party service. For example, third party device 220 may include a computing device, such as a server (e.g., a content server, a web server, a host server, a database server, a voice portal server, a payment processing server, a credit card processing server, etc.), a security device (e.g., a firewall, a gateway, an access point, etc.), an interactive voice recognition device, or a similar device. Third party device 220 may provide user device 210 with access to the third party service when user device 210 has been authenticated by authentication device 230. In some implementations, third party device 220 may send a session token to user device 210, so that user device 210 may attempt to authenticate via authentication device 230. Additionally, or alternatively, third party device 220 may receive, from authentication device 230, an indication that user device 210 is authenticated.

Authentication device 230 may include one or more devices capable of receiving, generating, storing, processing, and/or providing information associated with authentication (e.g., traffic flow information), and/or capable of authenticating a user and/or a device (e.g., user device 210) using traffic flow information. For example, authentication device 230 may include a computing device, such as a server (e.g., an authentication server, a firewall, etc.), a network device, or a similar device. Authentication device 230 may receive traffic flow information for operator network 250 from flow aggregation device(s) 240. In some implementations, authentication device 230 may receive, from user device 210, an authentication request from user device 210 that includes a session token. Additionally, or alternatively, based on the authentication request, authentication device 230 may determine that user device 210 should be authenticated using the traffic flow information and may provide an indication of the determination to third party device 220.

Flow aggregation device 240 may include one or more devices capable of aggregating and/or formatting traffic flow information received from monitoring traffic on operator network 250. Flow aggregation device 240 may be a group of devices, such as devices in a cloud computing environment, a data center, or the like. For example, flow aggregation device 240 may include a server device, a traffic transfer device, a gateway, a router, a modem, a switch, a firewall, a hub, a bridge, a load balancer, and/or a similar device. In some implementations, flow aggregation device 240 may provide traffic flow information to authentication device 230.

Operator network 250 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. Additionally, or alternatively, operator network 250 may include a cellular network, a public land mobile network (PLMN), a second generation (2G) network, a third generation (3G) network, a fourth generation (4G) network, a fifth generation (5G) network, and/or another network.

Network 260 may include one or more wired and/or wireless networks. For example, network 260 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
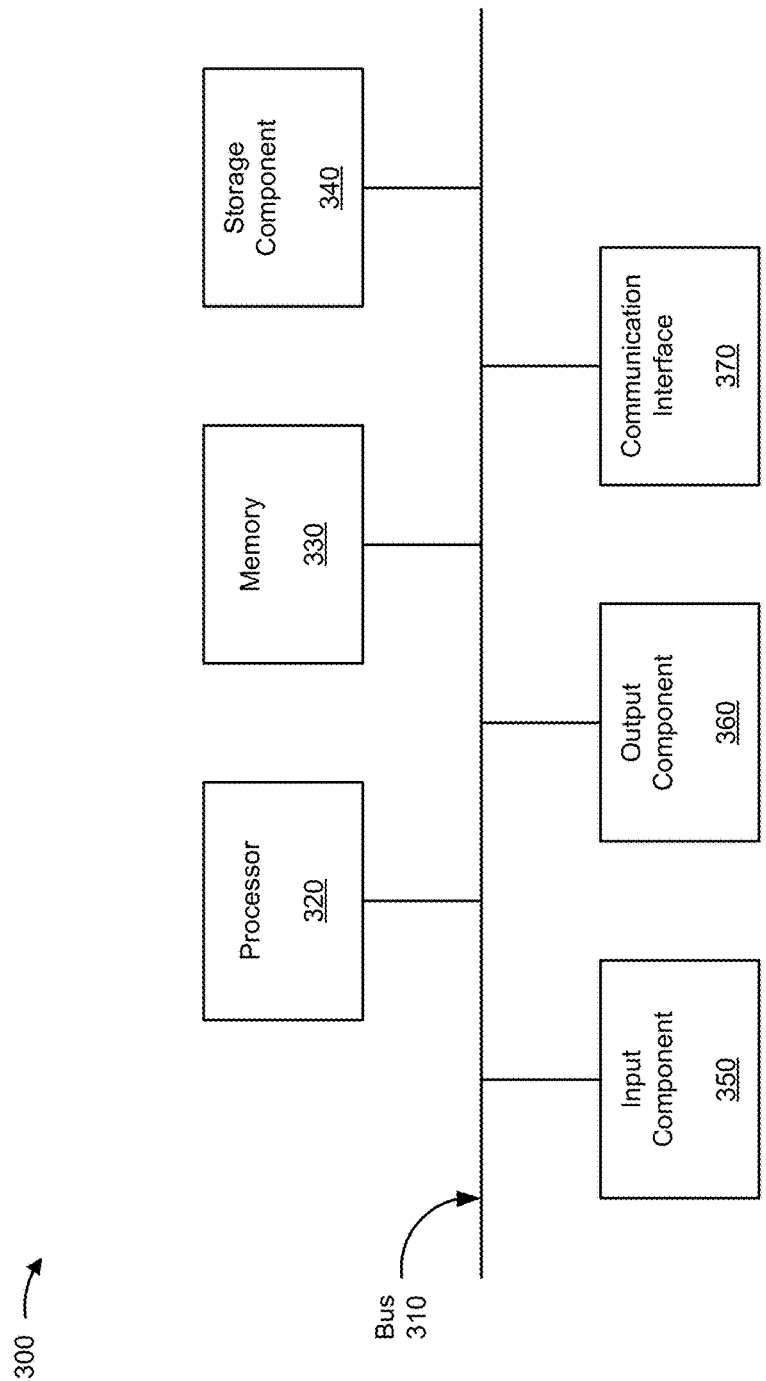
FIG. 3 is a diagram of example components of one or more devices of FIG. 2.

FIG. 3 is a diagram of example components of a device 300. Device 300 may correspond to user device 210, third party device 220, authentication device 230, and/or flow aggregation device 240. In some implementations, user device 210, third party device 220, authentication device 230, and/or flow aggregation device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
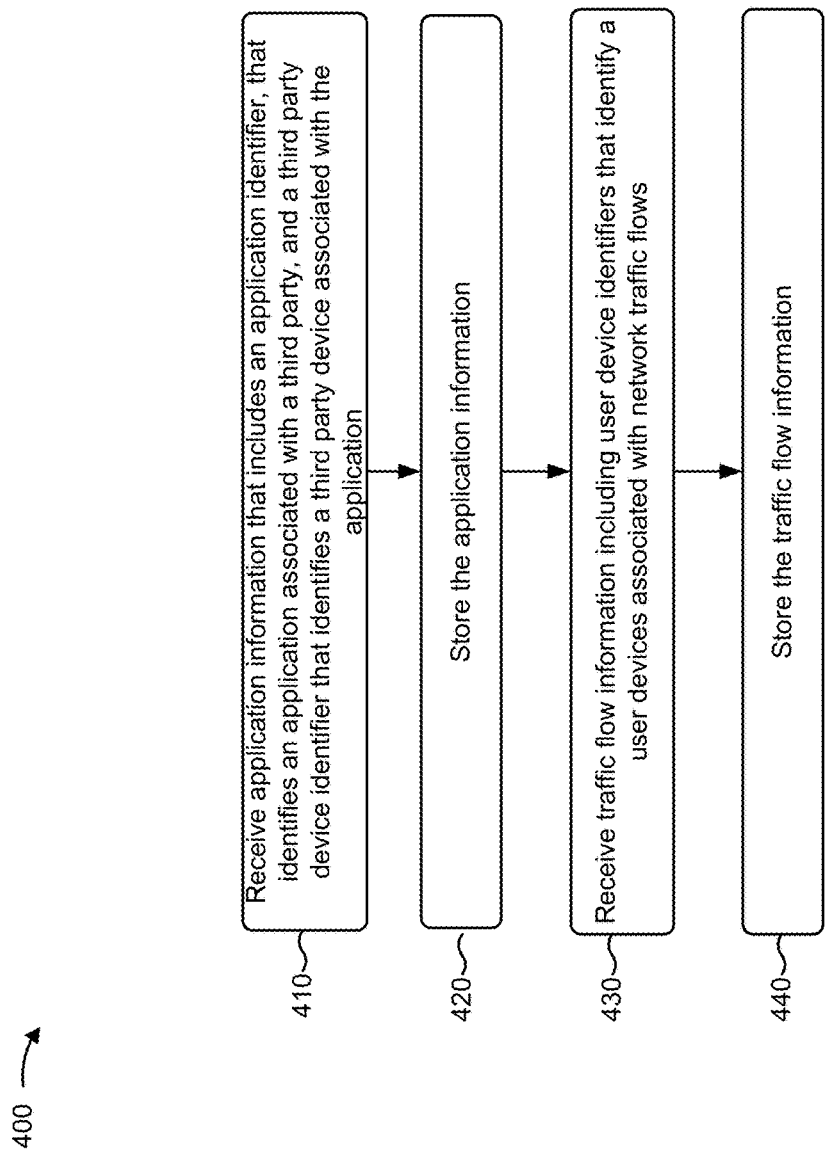
FIG. 4 is a flow chart of an example process for registering an application for authentication using traffic flow information, and capturing and storing the traffic flow information.

FIG. 4 is a flow chart of an example process 400 for registering an application for authentication using traffic flow information, and capturing and storing the traffic flow information. In some implementations, one or more process blocks of FIG. 4 may be performed by authentication device 230. In some implementations, one or more process blocks of FIG. 4 may be performed by another device or a set of devices separate from or including authentication device 230, such as user device 210, third party device 220, and/or flow aggregation device 240.

As shown in FIG. 4, process 400 may include receiving application information that includes an application identifier, that identifies an application associated with a third party, and a third party device identifier that identifies a third party device associated with the application (block 410). For example, authentication device 230 may receive application information. In some implementations, authentication device 230 may receive application information via network 260. The application information may be generated, for example, from a registration process available to third parties via a user interface.

In some implementations, authentication device 230 may receive application information that includes an application identifier. The application identifier may include information that identifies an application associated with a third party that provides a third party service accessible by user device 210. For example, the application identifier may be a string of characters used as a label or a designator in association with the application (e.g., "App123"). In some implementations, the application may execute on user device 210 to access the third party service (e.g., a banking service) provided by third party device 220. In some implementations, the application may execute on third party device 220 via another application or a browser executing on user device 210. The other application or browser may give access to the application executing on the third party device.

Additionally, or alternatively, authentication device 230 may receive application information that includes a third party identifier. The third party identifier may include information that identifies the third party providing the application information. For example, the third party identifier may include a name of the third party, a customer number, or the like.

Additionally, or alternatively, authentication device 230 may receive application information that includes a third party device identifier. The third party device identifier may include information that identifies third party device 220 that is associated with the application (e.g., the application may allow access to the third party service hosted on the third party device 220). For example, the third party device identifier may include a network address (e.g., an internet protocol (IP) address, a media access control (MAC) address, etc.) of third party device 220, which is associated with the application.

Additionally, or alternatively, authentication device 230 may receive application information that includes authentication preferences of the third party. The authentication preferences of the third party may include additional pieces of information, about user device 210, that the third party wishes third party device 220 to receive, upon authentication by authentication device 230, that may improve security or further aid in authentication. For example, an authentication preference may indicate that the third party device 220 is to receive, from authentication device 230, a mobile directory number (MDN) associated with user device 210, information identifying a geographic location of user device 210, or the like when receiving an indication that user device 210 is authenticated based on traffic flow information.

As further shown in FIG. 4, process 400 may include storing the application information (block 420). For example, authentication device 230 may store the application information, which may include the application identifier, the third party identifier, the third party device identifier, and/or one or more authentication preferences. In some implementations, the application identifier, the third party identifier, the third party device identifier, and/or the authentication preference(s) may be stored in a data structure that associates the application identifier, the third party identifier, the third party device identifier, and/or the authentication preference(s) with one another.

As further shown in FIG. 4, process 400 may include receiving traffic flow information including user device identifiers that identify user devices associated with network traffic flows (block 430). For example, authentication device 230 may receive traffic flow information from devices, which are part of operator network 250. These devices may monitor network traffic associated with operator network 250. The network traffic may include traffic related to voice services (e.g., phone calls), traffic related to messaging services (e.g., short message service (SMS) messages, multimedia messaging service (MMS) messages, or the like), and/or traffic related to data services (e.g., music streaming, web browsing, etc.).

In some implementations, operator network 250 may be a Radio Access Network (RAN), which may monitor and control signals from user devices 210. When the RAN identifies a transmission related to data services outside of operator network 250 (e.g., data services available via the internet), the RAN may provide the transmission to a gateway of an Evolved Packet Core (EPC) to be transmitted as a network traffic flow.

The network traffic flow (which may include a 5-tuple) may be a sequence of IP packets which include information that identifies a transport layer protocol (e.g., user datagram protocol (UDP) or transmission control protocol (TCP)), a source network address (e.g., a source IP address), a source port, a destination network address (e.g., destination IP address), and a destination port. Flow aggregation device 240, which may be part of the EPC, may monitor the network traffic flow being transmitted by the EPC. Similarly, flow aggregation device 240 may monitor a network traffic flow sent for delivery to user device 210 when the network traffic flow is provided to the EPC before the EPC provides the network traffic flow to the RAN.

Flow aggregation device 240 may capture traffic flow information. In some implementations, the traffic flow information may include information about network traffic flows that are associated with user device 210. The network traffic flows may be associated with user device 210 by the user device identifier (e.g., the source network address or the destination network address).

Additionally, or alternatively, the traffic flow information may include a fixed device identifier for a user device 210 associated with the network traffic flow. The fixed device identifier may be information, that identifies a user device 210 associated with operator network 250, which is fixed (e.g., unique) to user device 210. For example, the fixed device identifier may be a telephone number (e.g., an MDN), an international mobile subscriber identity (IMSI), an international mobile station equipment identity (IMEI), or the like. In some cases, the fixed device identifier may not be an IP address, which may be assigned only temporarily to user device 210. User device 210 may be associated with the network traffic flow because user device 210 was a source user device 210 (e.g., made a transmission that is part of the network traffic flow) or a destination user device 210 (e.g., received a transmission that is part of the network traffic flow).

In some implementations, flow aggregation device 240 may collect the traffic flow information. Additionally, or alternatively, flow aggregation device 240 may aggregate the traffic flow information. Additionally, or alternatively, flow aggregation device 240 may format the traffic flow information for use by authentication device 230. Additionally, or alternatively flow aggregation 240 may provide the traffic flow information to authentication device 230.

As further shown in FIG. 4, process 400 may include storing the traffic flow information (block 440). For example, authentication device 230 may store the traffic flow information, which may include the fixed device identifier and information included in the network traffic flow. In some implementations, the fixed device identifier and the information included in the network traffic flow may be stored in a searchable data structure that associates the fixed device identifier and the information included in the network traffic flow with one another. In some implementations, the traffic flow information may be stored in a way that associates the source network address (e.g., source IP address) with the fixed device identifier of the source user device 210 if associated with operator network 250. Additionally, or alternatively, the traffic flow information may be stored in a way that associates the destination network address (e.g., destination IP address) with the fixed device identifier of the destination user device 210 if associated with operator network 250.

In some implementation the traffic flow information may be stored locally on authentication device 230. Additionally, or alternatively, the traffic flow information may be stored remotely from authentication device 230, while still remaining accessible to authentication device 230.

The application information and the traffic flow information may be useful to authentication device 230 in performing authentication using traffic flow information, as described elsewhere herein. Furthermore, the traffic flow information permits the authentication device 230 to efficiently use processing resources when authenticating user device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
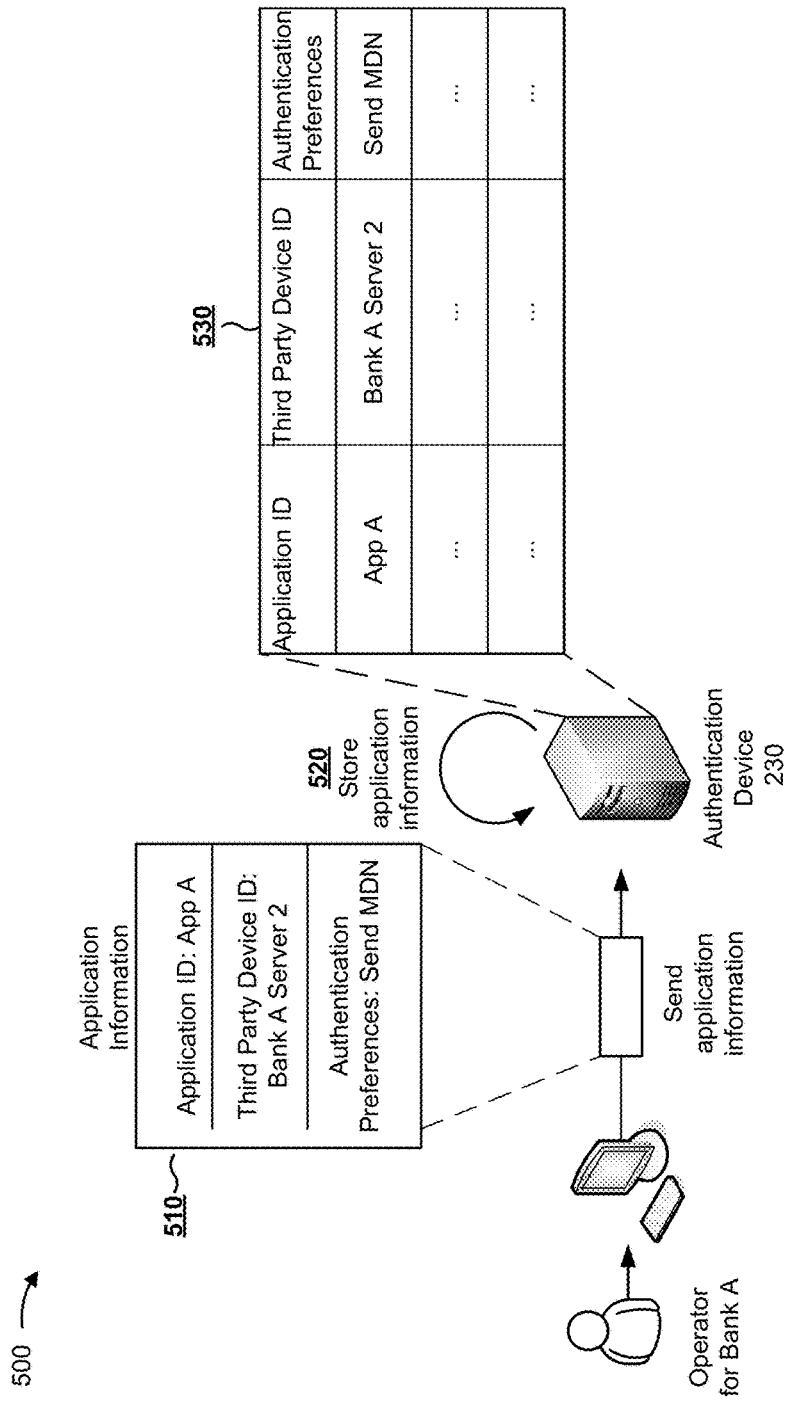
FIGS. 5A and 5B are diagrams of an example implementation relating to the example process shown in FIG. 4.
Figure 5B:
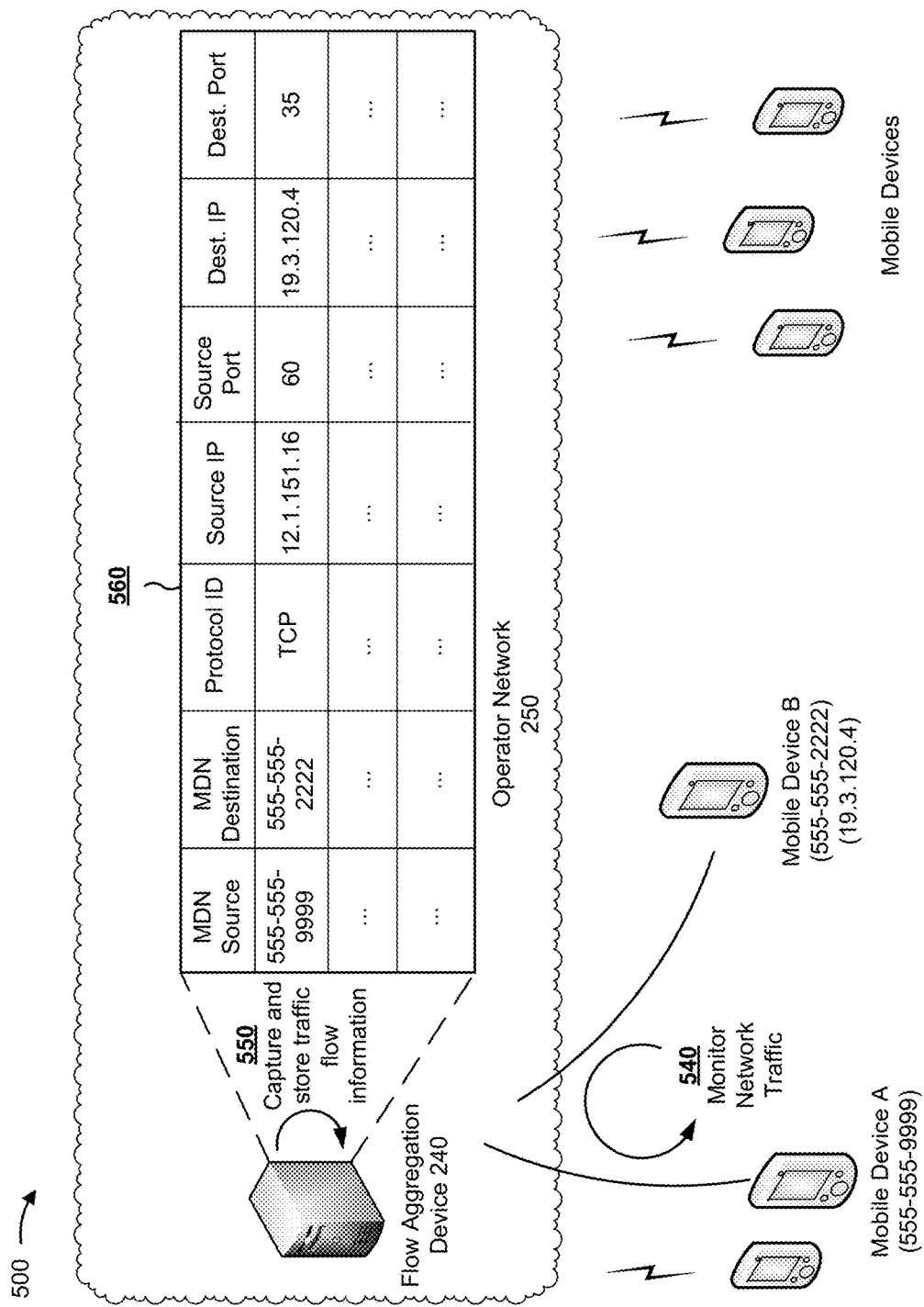

FIGS. 5A and 5B are diagrams of an example implementation 500 relating to example process 400 shown in FIG. 4. FIGS. 5A and 5B show an example of registering an application for authentication using traffic flow information, and capturing and storing the traffic flow information.

As shown in FIG. 5A, and by reference number 510, assume that an operator for Bank A enters application information using an input device which sends the application information to authentication device 230. The application information includes an application identifier (e.g., "App A") and a third party device identifier (e.g., "Bank A Server 2"), and the authentication preferences which may include the information that Bank A would want about user device 210 when user device 210 is authenticated (as shown here, the MDN associated with user device 210). As shown by reference number 520, authentication device 230 stores the application information. As shown by reference number 530, the application information is stored and tracked as information in a data structure, which links the application identifier to the third party device identifier, and the authentication preferences.

As shown in FIG. 5B, and by reference number 540, assume that devices of operator network 250 monitor network traffic of user devices 210 (e.g., Mobile Phone A and Mobile Phone B) that are associated with operator network 250. As shown, flow aggregation device(s) 240 monitor network traffic originating from Mobile Phone A (the source) and received by Mobile Phone B (the destination), which are both associated with operator network 250 in the example provided. As shown by reference number 550, flow aggregation device 240 captures and stores traffic flow information (e.g., the traffic flow information relating to the network traffic between Mobile Phone A and Mobile Phone B). As shown by reference number 560, flow aggregation device 240 may store the traffic flow information in a data structure which links fixed device identifiers (MDN source and MDN destination as shown here) with information associated with a network traffic flow (protocol ID (e.g., information that identifies the transport layer protocol), source IP address, source port, destination IP address, and destination port, as shown). In the provided example, the MDN source is 555-555-9999 (e.g. the MDN associated with Mobile Phone A), the MDN destination is 555-555-2222 (e.g., the MDN associated with Mobile Phone B), the protocol identifier is TCP, the source IP address is 12.1.151.16 (e.g., the IP address of Mobile Phone A), the source port is 60, the destination IP address is 19.3.120.4 (e.g., the IP address of Mobile Phone B) and the destination port is 35.

Flow aggregation device 240 may store traffic flow information for all (or a subset of users) user devices 210 associated with operator network 250, as described above. Flow aggregation device may send the traffic flow information to authentication device 230 for use by authentication device 230. The traffic flow information may be useful in determining whether user device 210 is associated with operator network 250, which can be used for authentication by authentication device 230, as described herein.

As indicated above, FIGS. 5A and 5B are provided merely as an example. Other examples are possible and may differ from what was described with regard to FIGS. 5A and 5B.

FIG. 6 is a flow chart of an example process 600 for authenticating a user device using traffic flow information. In some implementations, one or more process blocks of FIG. 6 may be performed by authentication device 230. In some implementations, one or more process blocks of FIG. 6 may be performed by another device or a set of devices separate from or including authentication device 230, such as user device 210, third party device 220, and/or flow aggregation device 240.

As shown in FIG. 6, process 600 may include receiving, from a user device, an authentication request to authenticate the user device for a third party service (block 610). For example, authentication device 230 may receive an authentication request from user device 210 via network 260. In some implementations, user device 210 may be executing (or running) an application that permits access to a third party service associated with third party device 220. For example, user device 210 may execute a banking application that permits access to an online banking service hosted by third party device 220. In some implementations, the application may execute on third party device 220 via another application or a browser executing on user device 210, which grants access to the application.

In some implementations, the authentication request may include a request by user device 210 to authenticate user device 210 with third party device 220 so that user device 210 can gain access to the third party service using the application. The authentication request may include a session token, an application identifier, and/or a user device identifier. The session token may be a unique string of characters used to identify a session that user device 210 may establish with third party device 220 using the application. User device 210 may have acquired the session token directly from third party device 220 when user device 210 was executing the application.

Additionally, or alternatively, the authentication request may include an application identifier, as described herein in connection with FIG. 4, to identify the application and link the session token with the application.

Additionally, or alternatively, the authentication request may include a user device identifier. The user device identifier may include information that identifies user device 210 that sent the authentication request. For example, the user device identifier may include a network address (e.g., an IP address, a MAC address, or the like) of user device 210.

Additionally, or alternatively, the authentication request may identify a geographic location of user device 210. The geographic location may include global positioning system (GPS) coordinates of user device 210, so that authentication device 230 has more information by which to authenticate user device 210. Authentication device 230 may compare the geographic location of the user device to a database containing the geographic location of each user device 210.

In some implementations, the authentication request may be sent by user device 210 without a user of user device 210 having to enter a username and password in the application (e.g., replacing authentication using username and password). In some implementations, user device 210 may send the authentication request after the user has entered a username and password, that was verified by third party device 220, to supplement authentication using a username and password.

As further shown in FIG. 6, process 600 may include comparing the user device identifier to one or more user device identifiers included in traffic flow information (block 620). For example, authentication device 230 may compare the user device identifier from the authentication request to one or more user device identifiers included in the traffic flow information (e.g., traffic flow information accessible by authentication device 230, as described above with regard to FIG. 4). The traffic flow information may include information included in a network traffic flow, such as a network address (e.g., a source IP address or a destination IP address). The network address captured from the network traffic flow is a user device identifier and authentication device 230 may match this user device identifier to the user device identifier from the authentication request.

In some implementations, the one or more user device identifiers included in the traffic flow information may be stored in a data structure, which may include additional information about one or more user devices 210. For example, the data structure may include one or more fixed device identifiers (e.g., an MDN) associated with the one or more user device identifiers. A fixed device identifier may be useful as a way of identifying user device 210 using characteristics which may be more permanent than a user device identifier, which may, for example, be the IP address assigned to user device 210 for a limited period of time.

As further shown in FIG. 6, process 600 may include determining whether to authenticate the user device based on comparing the user device identifier with the one or more user device identifiers of the traffic flow information (block 630). For example, authentication device 230 may determine whether to authenticate user device 210. In some implementations, authentication device 230 may authenticate user device 210 when the user device identifier of user device 210 matches a user device identifier associated with operator network 250 (e.g., when the user device identifier matches one of the one or more user device identifiers stored in the data structure of the traffic flow information). For example, if the user device identifier does not match any of the user device identifiers stored in the data structure, then authentication device 230 may not authenticate user device 210.

In some implementations, authentication device 230 may differentiate a user device identifier, associated with operator network 250, from a user device identifier not associated with operator network 250. For example, authentication device 230 may determine that the user device identifier is associated with a fixed device identifier stored in the data structure. If, for instance, a user device identifier (e.g., an IP address) is stored, but has no associated fixed device identifier (e.g., an MDN), the user device identifier may be associated with a device that is not part of operator network 250. For example, if user device 210 sends a message to a server hosting a webpage or a user device 210 that is not on operator network 250, then there would be no associated fixed device identifier for the user device identifier that received the message. In some cases, authentication device 230 may only authenticate a user device 210 with a user device identifier that is both stored in the data structure and associated with a fixed device identifier. In some implementations, authentication device 230 may prevent authentication of a user device 210 with a user device identifier that is not stored in the data structure, or a user device 210 with a user device identifier that is stored in the data structure but not associated with a fixed device identifier. This may conserve computing resources by reducing the number of authentications performed by authentication device 230.

Additionally, or alternatively, authentication device 230 may use the location of user device 210, if provided in the authentication request, in the authentication of user device 210. Authentication device 230 may compare the location to a database of stored locations of user devices 210 (e.g., determined from the monitoring of user devices 210 on operator network 250). Authentication device 230 may prevent authentication of user device 210 unless the location matches the location in the database.

As further shown in FIG. 6, process 600 may include identifying a third party device associated with the application (block 640). For example, authentication device 230 may identify third party device 220, associated with the application, using the application identifier from the authentication request. In some implementations, as described above, the authentication request may include the application identifier, which identifies the application that user device 210 is using to access the third party service. Authentication device 230 may identify third party device 220 by using application information that authentication device 230 may have stored (e.g., when an operator provided input to register the application). The application information may include a third party device identifier, which is used to identify third party device 220, as described above, that is linked to an application identifier via a data structure. Using the application identifier from the authentication request and the information stored in the data structure, authentication device 230 may match the application identifier from the authentication request to an application identifier in the data structure to determine the third party device identifier. Authentication device 230 may use the third party device identifier, to identify third party device 220, when completing authentication of user device 210 for third party device 220.

As further shown in FIG. 6, process 600 may include providing, to the third party device, a session token and an indication of whether the user device has been authenticated, thereby causing the third party device to permit or deny access to the third party service by the user device (block 650). For example, authentication device 230 may provide, to third party device 220, the session token, from the authentication request, and an indication of whether user device 210 has been authenticated. In some implementations, third party device 220 may be identified based on the application identifier in the authentication request, as described above. Authentication device 230 may provide the session token and the indication via network 260 by sending a transmission (e.g., an authentication message).

In some implementations, the indication of whether the user device 210 has been authenticated may be derived from specific information in the authentication message. For example, the message may include a tag, which indicates that the user device is authenticated or not authenticated. In some cases, authentication device 230 may only send the message with the session token when user device 210 is authenticated and, therefore, the sending of the authentication message may serve as an indication of authentication. For example, if user device 210 was not part of operator network 250, then authentication device 230 may not send the authentication message with the session token. By not sending the authentication message when the user device 210 was not part of the operator network, authentication device 230 may conserve computing resources and network bandwidth.

Additionally, or alternatively, authentication device 230 may include additional information, in the authentication message, that may aid third party device 220 in the authentication of user device 210. The additional information may be established from authentication preferences from a registration process, as described herein in connection with FIG. 4.

In some implementations, the additional information may include the fixed device identifier (e.g., an MDN). Authentication device 230 may have access to the fixed device identifier from traffic flow information that was stored. This may be useful to a third party device 220 because the third party device 220 may have access to information about user device 210, like the MDN, based on a past transaction the user had with the third party. For example, a bank may know the telephone number (e.g., the MDN) of a customer of the bank and could use the telephone number to help in the authentication of the user.

Additionally, or alternatively, the additional information may include information about the user. Authentication device 230 may get additional information about the user (e.g., the user's name, street address, subscription history, credit card number, etc.), from a database of users, based on the fixed device identifier. Third party device 220 may have access to information about the user and could match that to the information that authentication device 230 sends in the authentication message.

Additionally, or alternatively, the additional information may include information about a geographic location of user device 210. Authentication device 230 may find the geographic location of user device 210, from a database that stores location information about user devices 210, based on the fixed device identifier. Third party device 220 may have access to the geographic location of user device 210 from the application (e.g., when the application collects location information) or based on knowledge about where the application may be used (e.g., when an application can only be used in specific geographic locations) and could match the location information to the information that authentication device 230 sends in the authentication message.

Implementations described in association with FIG. 6 may provide a means of authentication using traffic flow information. Authentication using traffic flow information may reduce user reliance on usernames and passwords and/or may increase security over other means of authentication, such as authentication using a username and password.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
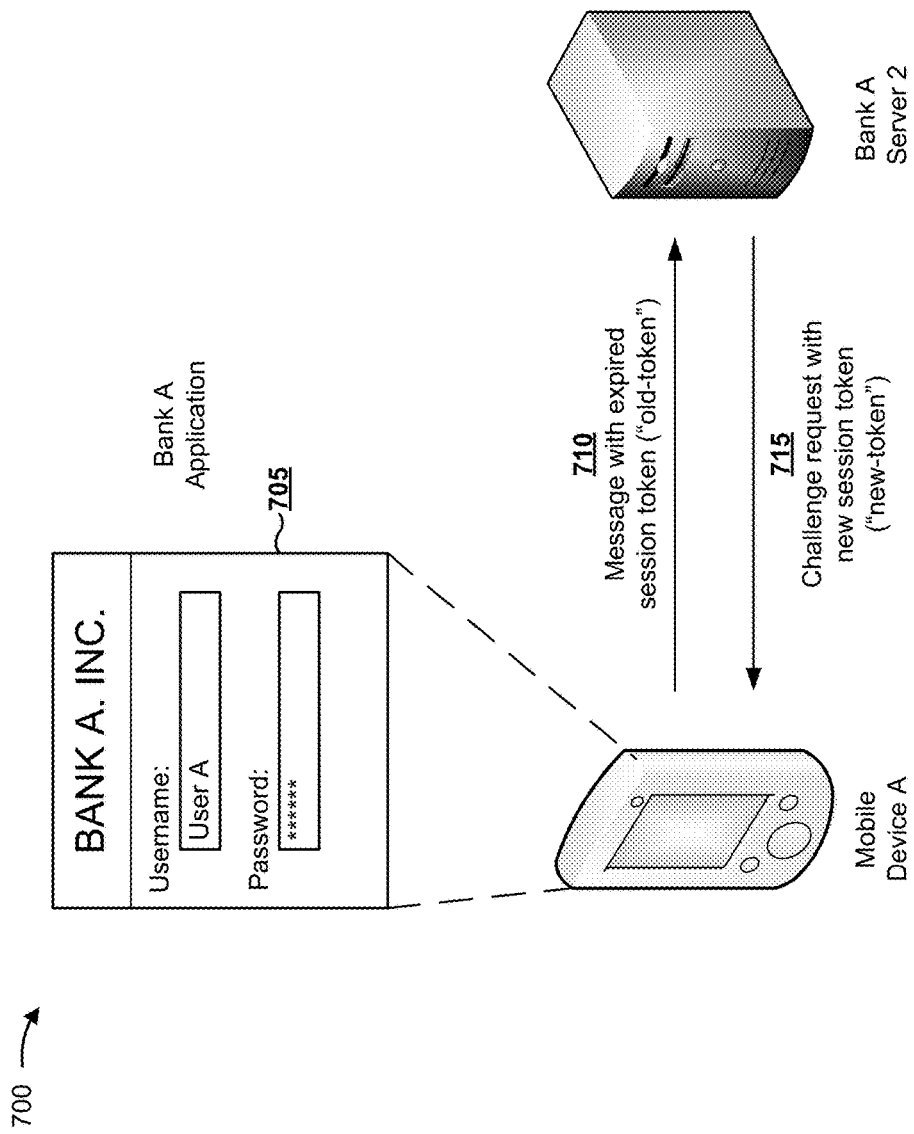
FIGS. 7A-7D are diagrams of an example implementation relating to the example process shown in FIG. 6.

FIGS. 7A-7D are diagrams of an example implementation 700 relating to example process 600 shown in FIG. 6. FIGS. 7A-7D show an example of authenticating a user using traffic flow information. For the purpose of FIGS. 7A-7D, assume that the operations described herein in connection with FIGS. 5A and 5B have been performed. Also, assume that Mobile Device A is a user device 210 and that Bank A Server 2 is a third party device 220. As shown in FIG. 7A, and by reference number 705, assume that Mobile Device A executes an application associated with Bank A, shown as Bank A application. Bank A application provides for display, on Mobile Device A's screen, a prompt which requires a username and password. Assume that User A enters his username and password and attempts to log in. As shown by reference number 710, Mobile Device A, based on the attempt to log in, sends a message, to Bank A Server 2, with the username and password and the expired session token, shown as "old-token." A shown by reference number 715, because "old-token" is expired, Bank A Server 2 sends a challenge request, to Mobile Device A, with a new session token, shown as "new-token."

Figure 7B:
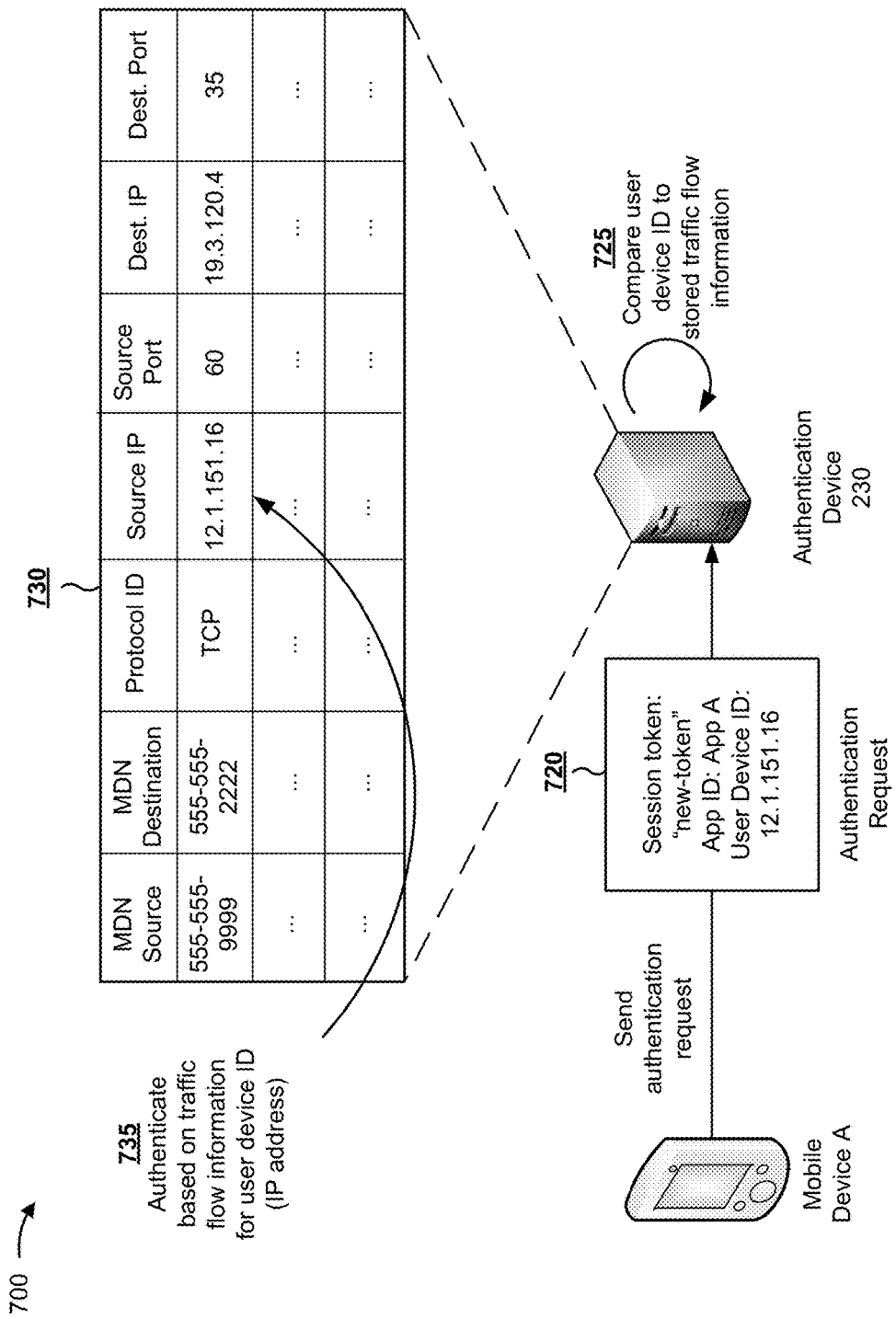

As shown in FIG. 7B, and by reference number 720, Mobile Device A sends an authentication request to authentication device 230. The authentication request includes a session token ("new-token"), an application identifier ("App A"), and a user device identifier shown as an IP address ("12.1.151.16"). As shown by reference number 725, authentication device 230 compares the user device identifier to stored traffic flow information.

As shown by reference number 730, the stored traffic flow information includes fixed device identifiers (MDN source and MDN destination as shown here) and information included in a network traffic flow (protocol ID (e.g., information that identifies the transport layer protocol), source IP address, source port, destination IP address, and destination port as shown). In the provided example, the MDN source is 555-555-9999, the MDN destination is 555-555-2222, the protocol identifier is TCP, the source IP address is 12.1.151.16, the source port is 60, the destination IP address is 19.3.120.4, and the destination port is 35. As shown by reference number 735, authentication device 230 may authenticate Mobile Device A based on the traffic flow information and the user device identifier. In the provided example, the user device identifier of mobile device A (12.1.151.16) matches the source IP address in the traffic flow information and is, therefore, associated with the MDN source (555-555-9999).

Figure 7C:
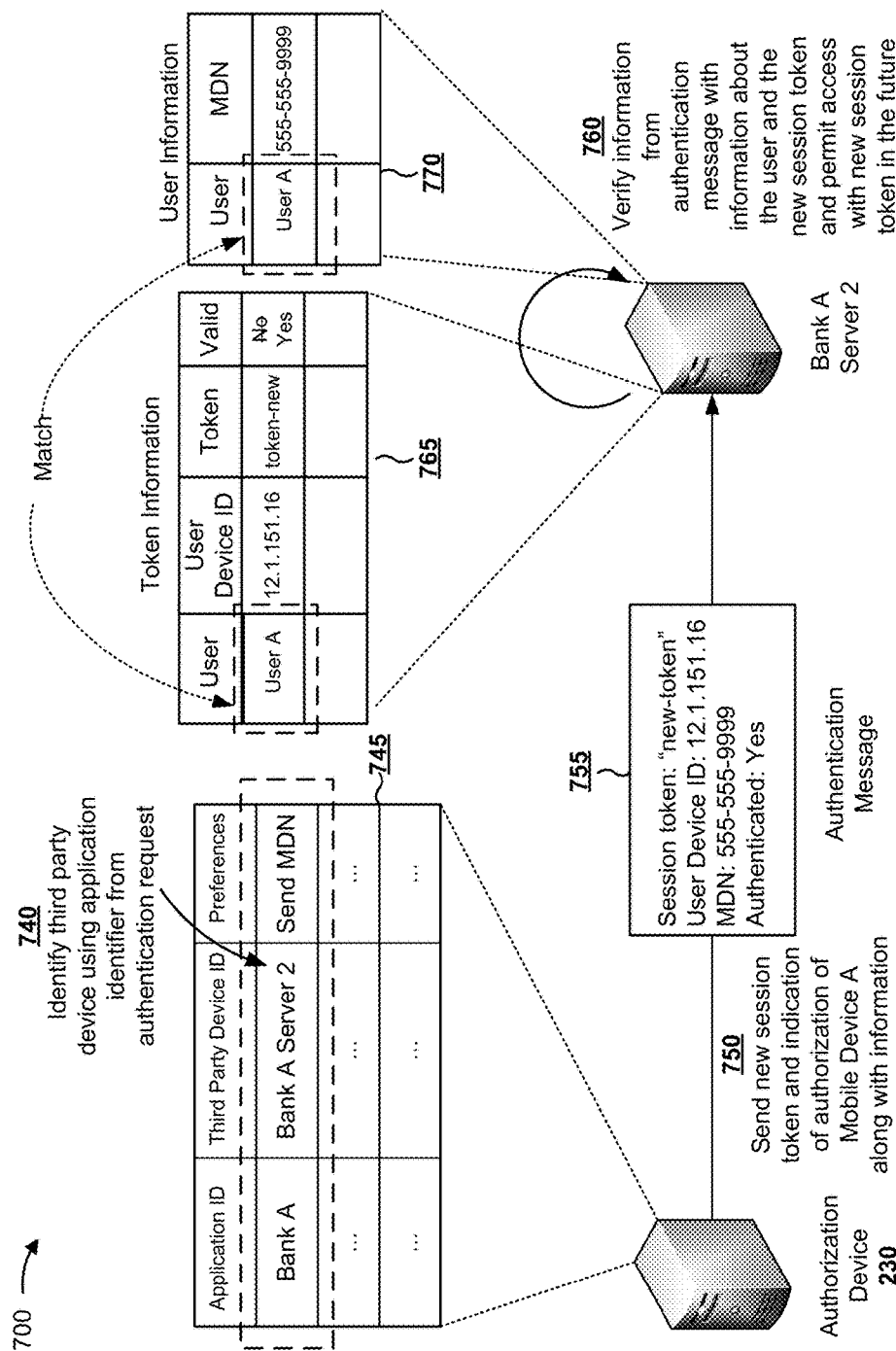

As shown in FIG. 7C, and by reference number 740, authentication device 230 identifies third party device 220 using the application identifier from the authentication request. As shown by reference number 745, the application identifier from the authentication request, App A, is associated with Bank A Server 2, and therefore Bank A Server 2 is properly identified as third party device 220. As shown by reference number 750, authentication device 230 sends an authentication message, to Bank A Server 2, which includes the session token and an indication of authentication of Mobile Device A and information about Mobile Device A. As shown by reference number 755, information that authentication device 230 sends, to Bank A Server 2, includes the new session token ("new-token"), the user device identifier (12.1.151.16), the MDN (555-555-9999), and an indication that user device 210 is authenticated.

As shown by reference number 760, Bank A Server 2 verifies information from the authentication message with information about the user and the new session token and permits access using the new session token in the future. As shown by reference number 765, Bank A Server 2 identifies that User A is associated with an authorized user based on token information, that Bank A Server 2 stored from attempts to log in, such as the device identifier (12.1.151.16) and the new session token ("new-token") from the authentication message. As shown by reference number 770, Bank A Server 2 identifies that User A is associated with the MDN (555-555-9999) based on user information Bank A Server 2 has stored. Because, the user associated with the MDN matches the user associated with the token information, Bank A Server 2 can complete authentication for User A and permit access to Bank A Application. Furthermore, because authentication is complete for User A and the new session token, Bank A Server 2 marks the token as valid for future use.

Figure 7D:
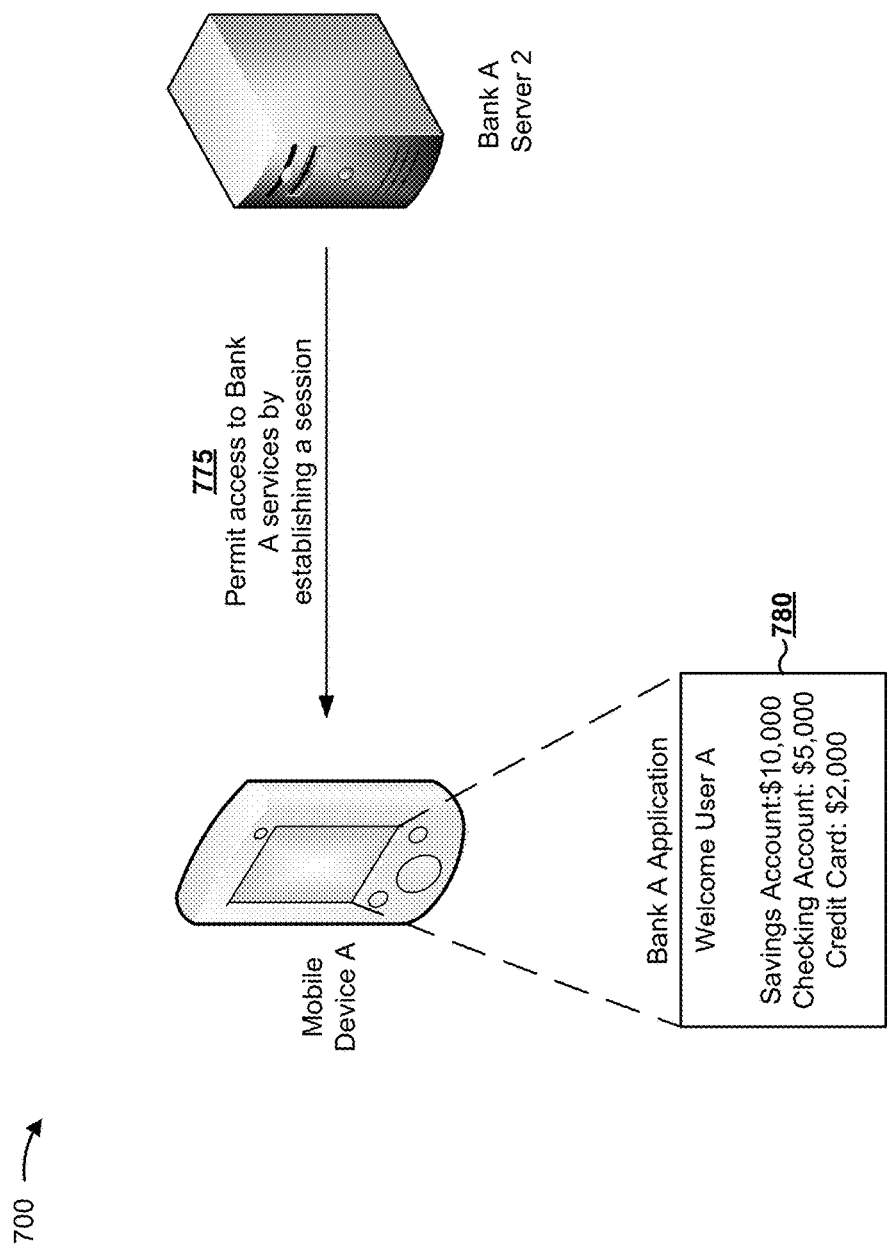

As shown by FIG. 7D, and by reference number 775, Bank A Server 2 permits Mobile Device A access to Bank A Services, based on verifying information from the authentication message, by establishing a session with Mobile Device A. As shown by reference number 780, the Bank A Application now provides financial information, for display, to Mobile Device A.

Implementations described in association with FIGS. 7A-7D may provide a means of authentication using traffic flow information. Authentication using traffic flow information may reduce user reliance on usernames and passwords and/or may increase security as described above.

As indicated above, FIGS. 7A-7D are provided merely as an example. Other examples are possible and may differ from what was described with regard to FIGS. 7A-7D.

Figure 8A:
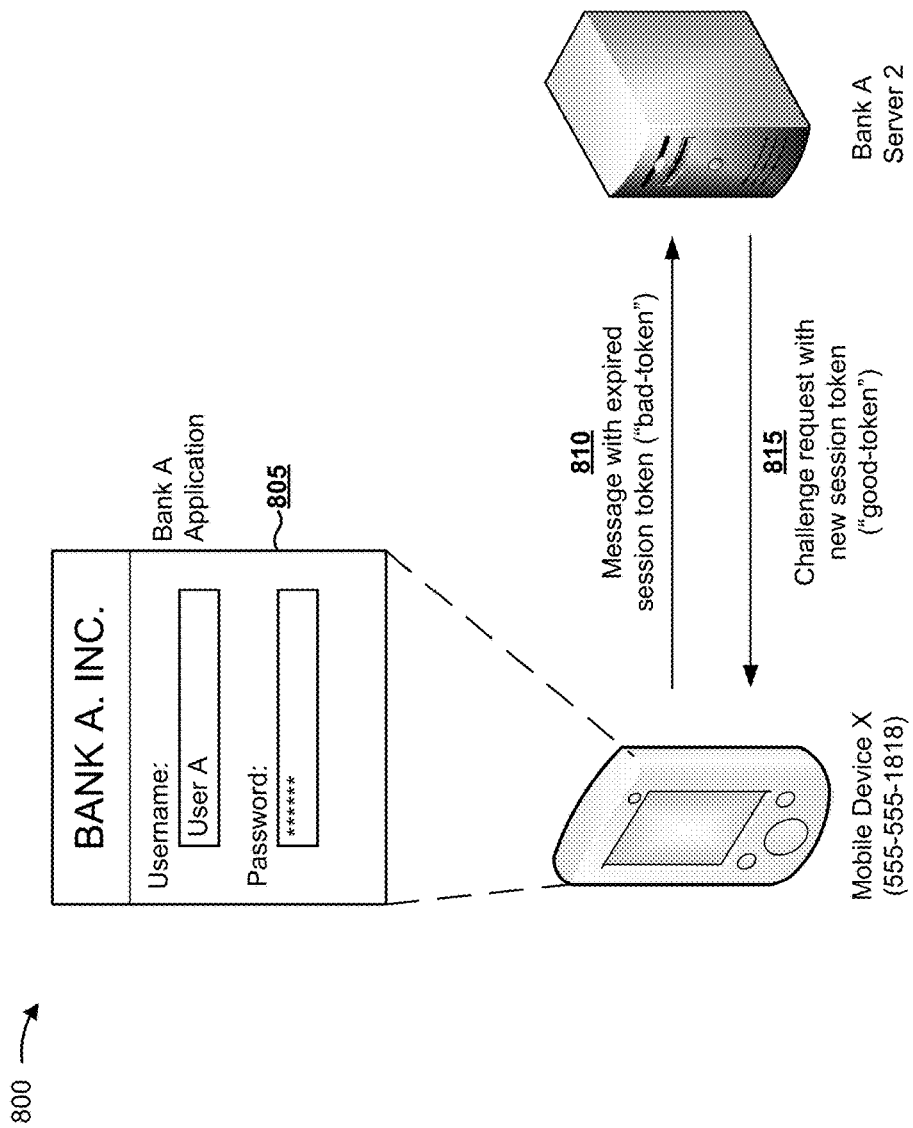
FIGS. 8A-8D are diagrams of an example implementation relating to the example process shown in FIG. 6.

FIGS. 8A-8D are diagrams of an example implementation 800 relating to example process 600 shown in FIG. 6. FIGS. 8A-8D show an example of authenticating a user using traffic flow information where the authentication fails. As shown in FIG. 8A, and by reference number 805, assume that Mobile Device X, with an MDN of 555-555-1818, executes an application associated with Bank A, shown as Bank A application. Bank A application provides for display, on Mobile Device A's screen, a prompt which asks for a username and password. Assume that User A enters his username and password and attempts to log in. As shown by reference number 810, Mobile Device X, based on the attempt to log in, sends a message, to Bank A Server 2, with the username and password and the expired session token, shown as "bad-token." A shown by reference number 815, because "bad-token" is expired, Bank A Server 2 sends a challenge request, to Mobile Device X, with a new session token, shown as "good-token."

Figure 8B:
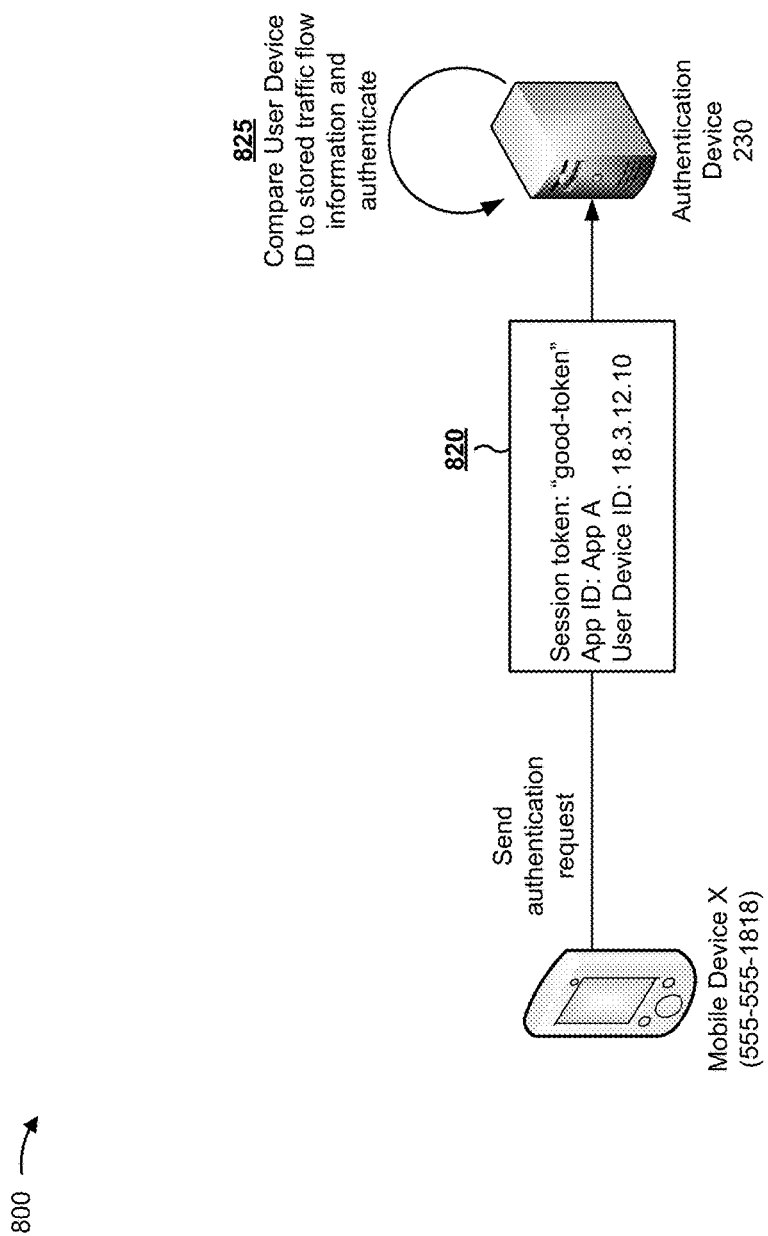

As shown in FIG. 8B, and by reference number 820, Mobile Device X sends an authentication request to authentication device 230. The authentication request includes a session token ("good-token"), an application identifier (App A), and user device identifier shown as an IP address (18.3.12.10). As shown by reference number 825, authentication device 230 compares the user device identifier to stored traffic flow information using a similar process as described above. Assume that the user device identifier for Mobile Device X is found in the stored traffic flow information and that Mobile Device X is authenticated.

Figure 8C:
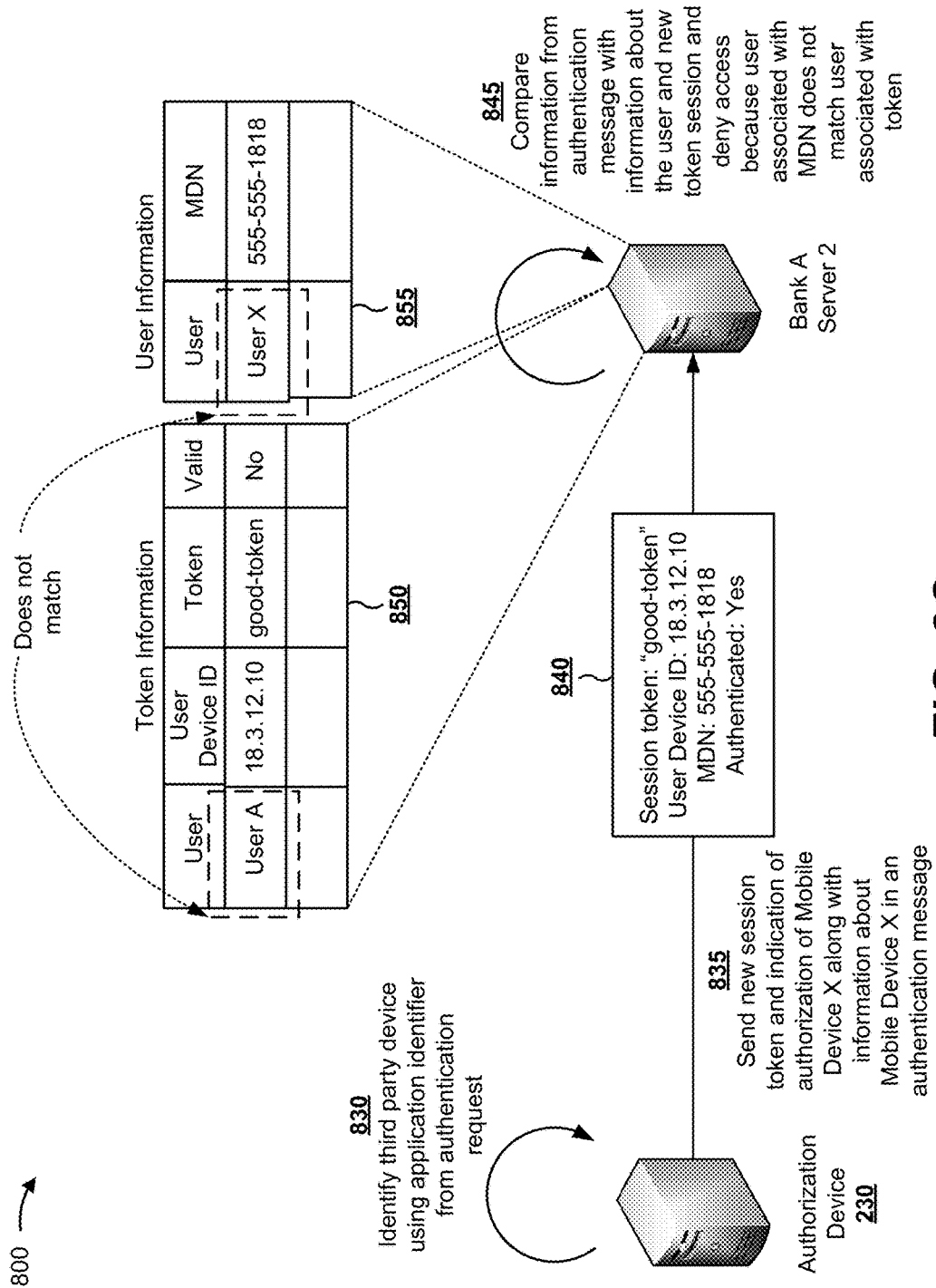

As shown by FIG. 8C, and by reference number 830, authentication device 230 identifies third party device 220 using the application identifier from the authentication request. Assume that the third party device is Bank A Server 2. As shown by reference number 835, authentication device 230 sends an authentication message, to Bank A Server 2, which includes the session token and an indication of authentication of Mobile Device X and information about Mobile Device X. As shown by reference number 840, information that authentication device 230 sends, to Bank A Server, includes the new session token ("good-token"), the user device identifier (18.3.12.10), the MDN (555-555-1818), and an indication that user device 210 is authenticated. As shown by reference number 845, Bank A Server 2 compares information from the authentication message with information about the user and the new session token and denies access because the user associated with the MDN does not match the user associated with the token. As shown by reference number 850, Bank A Server 2 identifies that User A is associated with the user based on token information, that Bank A Server 2 stored from attempts to log in, such as the device identifier (18.3.12.10) and the new session token ("good-token") from the authentication message. As shown by reference number 855, Bank A Server 2 identifies that User X is associated with the MDN (555-555-1818) based on user information Bank A Server 2 has stored. Because the user associated with the MDN does not match the user associated with the token information, Bank A Server 2 cannot complete authentication for User A and denies User A access based on the incomplete authentication.

Figure 8D:
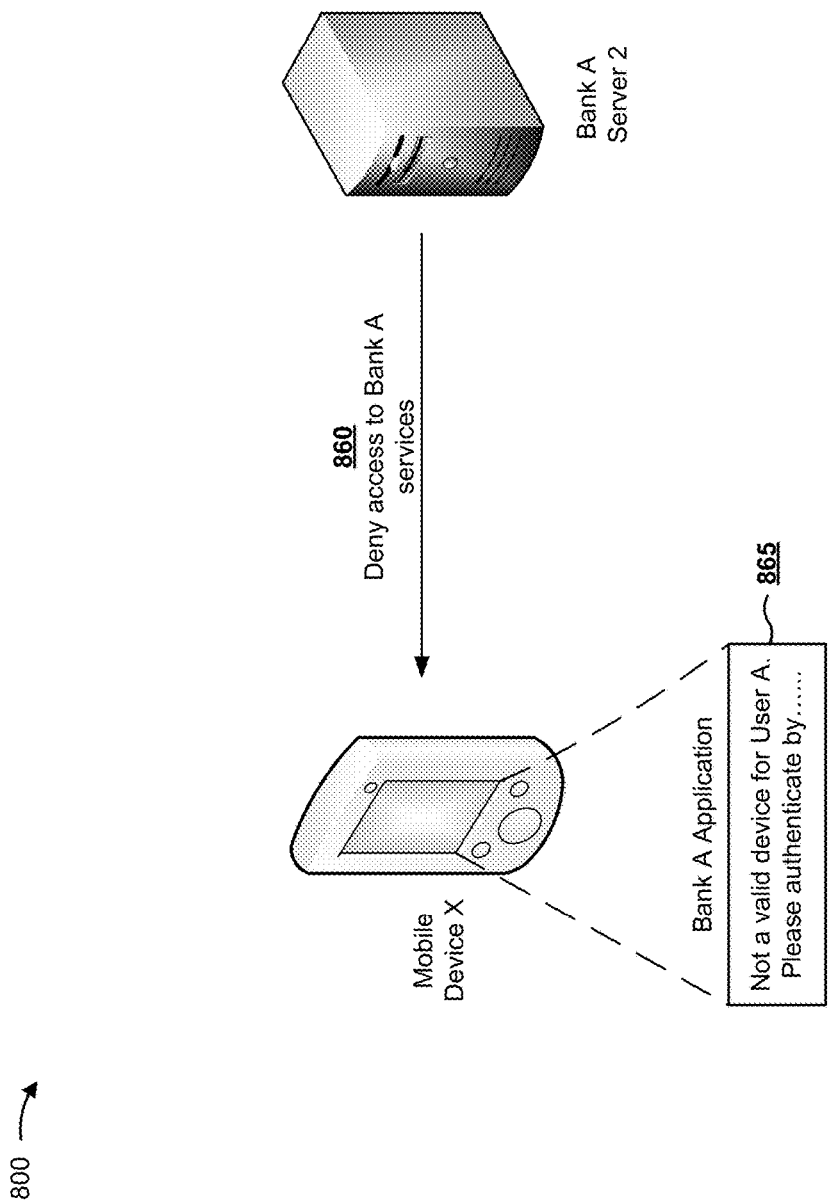

As shown by FIG. 8D, and by reference number 860, Bank A Server 2 denies Mobile Device X access to Bank A Services based on comparing information from the authentication message. As shown by reference number 865, the Bank A Application now provides, for display to Mobile Device X, a message, which indicates that Mobile Device X is not a recognized user device 210 for the application, and instructions for authentication by another method.

Implementations described in association with FIGS. 8A-8D may provide extra protection to users. For example, when a user tries to log in to an application on another device (or when another user tries to pretend to be the user), the application will not permit access to the user unless the user can authenticate by another method.

As indicated above, FIGS. 8A-8D are provided merely as an example. Other examples are possible and may differ from what was described with regard to FIGS. 8A-8D.

Implementations described herein may provide authentication using traffic flow information. Authentication using traffic flow information may be used as a substitute for of authentication by username and password, or as a supplement of authentication by username and password. Authentication using traffic flow information may be useful by improving security, increasing efficiency, and reducing reliance on usernames and passwords, which may be hacked, stolen, forgotten, misplaced, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
    a memory; and
    one or more processors, coupled to the memory, to:
        receive traffic flow information, associated with one or more network traffic flows of a network, that includes a plurality of user device identifiers of user devices communicating via the one or more network traffic flows,
            the traffic flow information including one or more of:
                a source network address,
                a source port identifier,
                a destination network address,
                a destination port identifier, or
                a protocol identifier,
            the plurality of user device identifiers being stored in a data structure, and
            the plurality of user device identifiers being source network addresses or destination network addresses;
        receive, from a user device accessing an application associated with a third party service, an authentication request to authenticate the user device with a third party device that provides the third party service,
            the authentication request including a session token that identifies a session, an application identifier that identifies the application, and a user device identifier that identifies the user device,
            the session token, with a challenge request, being received by the user device from a third party server after the user device sends an expired session token to the third party server, and the expired session token being sent by the user device to the third party server based on an attempt, associated with the application, to log-in;

determine that the user device identifier matches one of the plurality of user device identifiers stored in the data structure;

determine that the user device identifier is associated with a fixed device identifier stored in the data structure,
the fixed device identifier including one of:
a telephone number,
an international mobile subscriber identity (IMSI), or
an international mobile station equipment identity (IMEI);

determine that the user device is authenticated, as a valid user device that has communicated using the network, based on determining that the user device identifier matches the one of the plurality of user device identifiers stored in the data structure and based on determining that the user device identifier is associated with the fixed device identifier stored in the data structure; and provide, to the third party device, the session token and an indication that the user device is authenticated to permit the third party device to allow or deny access, by the user device, to the third party service.

2. The device of claim 1, where the one or more processors, when providing the session token and the indication that the user device is authenticated, are to:
provide, to the third party device, the session token, the indication that the user device is authenticated, and information to be used to identify the user device or a user of the user device to permit the third party device to allow or deny access, by the user device, to the third party service.

3. The device of claim 2, where the information to be used to identify the user device or the user of the user device includes at least one of:
a name associated with the user;
a street address associated with the user; or
a credit card number associated with the user.

4. The device of claim 1, where the one or more processors, when providing the session token and the indication that the user device is authenticated, are to:
provide, to the third party device, the session token, the indication that the user device is authenticated, and information identifying a geographic location of the user device to permit the third party device to allow or deny access, by the user device, to the third party service.

5. The device of claim 1, where the one or more processors, when receiving the authentication request, are to:
receive, from the user device accessing the application associated with the third party service, the authentication request to authenticate the user device with the third party device that provides the third party service, the authentication request including the session token that identifies the session, the application identifier that identifies the application, the user device identifier that identifies the user device, and information that identifies a geographic location of the user device.

6. The device of claim 5, where the one or more processors are further to:
determine that the geographic location matches one of a plurality of geographic locations, the user device being authenticated further when the geographic location matches the one of the plurality of geographic locations.

7. A non-transitory computer-readable medium storing instructions, the instructions comprising:
one or more instructions that, when executed by one or more processors, cause the one or more processors to:
receive traffic flow information that includes a plurality of user device identifiers of user devices communicating using one or more network traffic flows of a network,
the traffic flow information including one or more of:
a source network address,
a source port identifier,
a destination network address,
a destination port identifier, or
a protocol identifier,
the plurality of user device identifiers being stored in a data structure, and
the plurality of user device identifiers being source network addresses or destination network addresses;

receive, from a user device accessing an application associated with a third party service, an authentication request to authenticate the user device for a third party device, that provides the third party service,
the authentication request including a session token that identifies a session, an application identifier that identifies the application, and a user device identifier that identifies the user device,
the session token, with a challenge request, being received by the user device from a third party server after the user device sends an expired session token to the third party server, and
the expired session token being sent by the user device to the third party server based on an attempt, associated with the application, to log-in;

determine that the user device identifier matches one of the plurality of user device identifiers stored in the data structure;

determine that the user device identifier is associated with a fixed device identifier stored in the data structure,
the fixed device identifier including one of:
a telephone number,
an international mobile subscriber identity (IMSI), or
an international mobile station equipment identity (IMEI);

determine that the user device is authenticated, as a valid user device that has communicated using the network, based on determining that the user device identifier matches the one of the plurality of user device identifiers stored in the data structure and based on determining that the user device identifier is associated with the fixed device identifier stored in the data structure;

identify the third party device, associated with the application, based on the application identifier; and send, to the third party device, the session token and an indication that the user device is authenticated to permit the third party device to allow or deny access, by the user device, to the third party service.

8. The non-transitory computer-readable medium of claim 7, where the one or more instructions, that cause the one or more processors to send the session token and the indication that the user device is authenticated, cause the one or more processors to:
receive an authentication preference that indicates a particular type of information to be sent to the third party device, and
send, to the third party device, the session token, the indication that the user device is authenticated, and the particular type of information to permit the third party device to allow or deny access, by the user device, to the third party service.

9. The non-transitory computer-readable medium of claim 8, where the particular type of information includes at least one of:
a name associated with a user of the user device;
a street address associated with the user; or
a credit card number associated with the user.

10. The non-transitory computer-readable medium of claim 7, where the one or more instructions, that cause the one or more processors to send the session token and the indication that the user device is authenticated, cause the one or more processors to:
receive an authentication preference that indicates the third party device is to receive information that identifies a geographic location of the user device; and
send, to the third party device, the session token, the indication that the user device is authenticated, and the information that identifies the geographic location of the user device to permit the third party device to allow or deny access, by the user device, to the third party service.

11. The non-transitory computer-readable medium of claim 7, where the authentication request includes:
information that identifies a geographic location of the user device.

12. The non-transitory computer-readable medium of claim 11, where the user device is determined to be authenticated further based the geographic location.

13. A method, comprising:
receiving, by a device, traffic flow information, associated with one or more network traffic flows of a network, that includes a plurality of user device identifiers of user devices,
the user devices having communicated via the one or more network traffic flows,
the traffic flow information including one or more of:
a source network address,
a source port identifier,
a destination network address,
a destination port identifier, or
a protocol identifier,
the plurality of user devices identifiers being stored in a data structure, and
the plurality of user device identifiers being source network addresses or destination network addresses;
receiving, by the device and from a user device accessing an application associated with a third party service, an authentication request to authenticate the user device with a third party device providing the third party service,
the authentication request including a session token, an application identifier, and a user device identifier that identifies the user device,
the session token, with a challenge request, being received by the user device from a third party server after the user device sends an expired session token to the third party server, and
the expired session token being sent by the user device to the third party server based on an attempt, associated with the application, to log-in;
determining, by the device, that the user device identifier matches one of the plurality of user device identifiers stored in the data structure;
determine that the user device identifier is associated with a fixed device identifier stored in the data structure,
the fixed device identifier including one of:
a telephone number,
an international mobile subscriber identity (IMSI), or
an international mobile station equipment identity (IMEI);
determine that the user device is authenticated, as a valid user device that has communicated using the network, based on determining that the user device identifier matches the one of the plurality of user device identifiers stored in the data structure and based on determining that the user device identifier is associated with the fixed device identifier stored in the data structure; and
providing, by the device and to the third party device, the session token and an indication that the user device is authenticated to permit the third party device to allow or deny access, by the user device, to the third party service.

14. The method of claim 13, further comprising:
receiving an authentication preference that indicates a particular type of information to be sent to the third party device; and
where providing the session token comprises:
providing, to the third party device, the particular type of information to permit the third party device to allow or deny access, by the user device, to the third party service.

15. The method of claim 13, where providing the session token comprises:
providing, to the third party device, information that identifies the user device or a user associated with the user device to permit the third party device to allow or deny access, by the user device, to the third party service.

16. The method of claim 13, further comprising:
identifying the third party device, associated with the application, using the application identifier; and
where providing the session token comprises:
providing the session token and the indication to the third party device, based on identifying the third party device.

17. The method of claim 13, where providing the session token comprises:
providing, to the third party device, information that identifies a geographic location of the user device.

18. The device of claim 1, where a username and a password are entered during the attempt to log-in.

19. The non-transitory computer-readable medium of claim 7, where a username and a password are entered during the attempt to log-in.

20. The method of claim 13, where a username and a password are entered during the attempt to log-in.

* * * * *